US 6,674,762 B2

(12) United States Patent
Mores et al.

(10) Patent No.: US 6,674,762 B2
(45) Date of Patent: *Jan. 6, 2004

(54) SYSTEM FOR THE TRANSMISSION OF DATA

(75) Inventors: Robert Mores, Hamburg (DE); Harald Eisele, Pinneberg (DE)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,608

(22) Filed: Feb. 9, 1998

(65) Prior Publication Data
US 2003/0208700 A1 Nov. 6, 2003

(30) Foreign Application Priority Data
Feb. 10, 1997 (DE) .......................... 197 04 862

(51) Int. Cl.[7] .............................. H04L 12/28
(52) U.S. Cl. ........................ 370/421; 370/451
(58) Field of Search ................. 370/311, 389, 370/420, 421, 445, 447, 449, 450, 451, 452; 455/38.2, 38.3, 572, 573, 574; 710/107

(56) References Cited

U.S. PATENT DOCUMENTS

| 4,860,000 A | * | 8/1989 | Kobayashi ................. 340/825 |
| 4,903,280 A | * | 2/1990 | Lang et al. ................. 375/220 |
| 5,142,526 A | * | 8/1992 | Moriue et al. ............. 370/245 |
| 5,463,658 A | * | 10/1995 | Yee ............................ 370/462 |
| 5,550,804 A | * | 8/1996 | Haussler et al. ....... 340/825.01 |
| 5,581,556 A | * | 12/1996 | Ohie .......................... 370/431 |
| 5,650,757 A | * | 7/1997 | Barber ....................... 333/128 |
| 5,790,946 A | * | 8/1998 | Rotzoll ....................... 455/343 |

FOREIGN PATENT DOCUMENTS

DE  19523031  12/1996

* cited by examiner

Primary Examiner—Douglas Olms
Assistant Examiner—Bob A. Phunkulh
(74) Attorney, Agent, or Firm—Daniel J. Piotroski

(57) ABSTRACT

In an electronic system for the transmission of data between a number of stations, sub-system operation can be achieved by a suitable choice of signal levels and wake-up levels, so that some of the stations can communicate with one another while other stations are in a sleep mode in which power is saved.

6 Claims, 2 Drawing Sheets

SYSTEM FOR THE TRANSMISSION OF DATA

BACKGROUND OF THE INVENTION

The invention relates to a system for the transmission of information between a plurality of stations which are interconnected via a bus, consisting of at least one conductor, and transmit, via said bus, information encoded in the form of different signal levels.

A system of this kind is already known, for example from DE 195 23 031 A1.

Therein, a station is essentially in one of two different modes. In the normal or active mode the communication is possible between all stations, i.e. all stations can correctly receive a message transmitted by any other station, a transmitting station imposing the appropriate signal level on the bus by means of a bus driver. In the sleep mode a sleep level occurs on the bus and communication is not possible; however, a message transmitted by an arbitrary station can be interpreted by the other stations as a request for changing over the system to the normal mode, so that via the bus the system can be woken up from the sleep mode and communication can be resumed.

Typical applications of such systems involve a large number of stations so that there is a need to save electric power, for example in vehicles in the parked state, so that the sleep mode should be entered as often and for as long as possible. However, at the same time there is usually a need that some of the stations would occasionally like to communicate with one another also in the sleep mode. The temporary normal operation of the overall system with all stations would not be acceptable for this purpose, considering the power consumption.

SUMMARY OF THE INVENTION

It is an object of the invention to enable sub-system operation in which some of the stations communicate with one another, whereas the remaining part of the stations remains in the sleep mode without interpreting the ongoing communication by some of the stations as a wake-up request.

This object is achieved according to the invention in that in addition to the signal levels there is defined an additional wake-up level which is situated outside the signal level range and can hence be clearly distinguished from the signal levels for all stations. If this wake-up level does not occur for a communication, the stations already in the sleep mode will remain in the sleep mode.

In order to achieve a sub-system operation starting from a sleep mode, first all stations are briefly woken up by the transmission of a wake-up level. This wake-up level normally succeeds a data message. If desired, the message can define the subscribers for the sub-system operation, so that the stations which are not addressed can immediately enter the sleep mode again. The further communication in the sub-system operation takes place on the basis of signal levels.

The invention also relates to a station which includes at least one receiver for receiving signals received via a bus, the station being switchable to the normal or active mode by way of a wake-up signal having a voltage level which lies outside the signal level range.

In order to avoid mix-ups and enhance the system consistency, in the stations the wake-up level can be interpreted logically identically to a signal level, so that during normal operation a message transmitted by a station by means of a bus driver which unduly operates with wake-up levels is correctly received by all stations in the same way as if the bus driver had used the normal signal levels.

BRIEF DESCRIPTION OF THE DRAWINGS

Embodiments of the invention will be described in detail hereinafter with reference to the drawing. Therein:

FIG. 4 shows diagrammatically the construction of a bus driver in a

DESCRIPTION OF THE PREFERRED EMBODIMENTS

Figure 1:
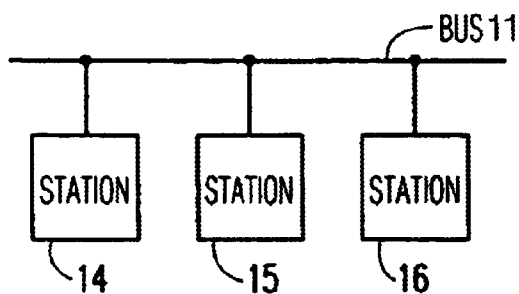
FIG. 1 shows a system with a plurality of stations which are interconnected via a bus.

FIG. 1 shows a system in which a number of stations 14, 15, 16 are connected to a bus 11 via which signals representing information are transmitted. These signals are binary signals which are transmitted serially via a single conductor or in phase opposition via two conductors. The bus may also include a conductor for power supply of the stations in as far as the stations are not provided with an own power supply source. Each station includes a receiver for the signals transmitted via the bus and normally also a bus driver whereby signals can be transmitted, via the bus, from the relevant station to all other stations.

Figure 2:
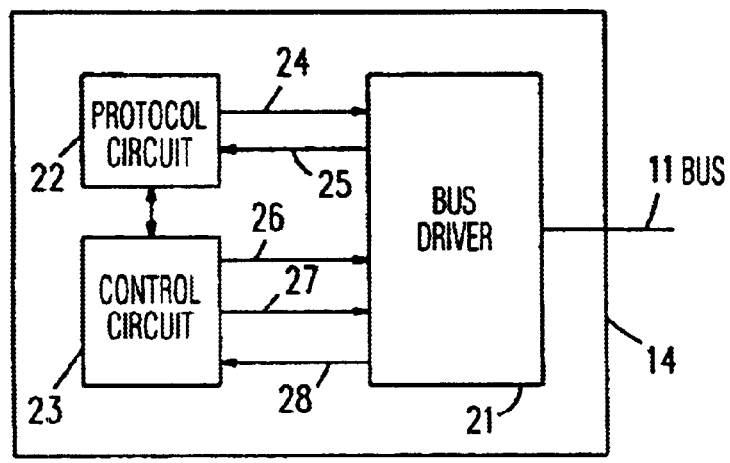
FIG. 2 shows diagrammatically the construction of a station.

As is shown in FIG. 2, each station, for example the station 14, includes at least one bus driver 21 which is connected to the bus 11, a circuit 22 for executing a protocol for the reliable transmission of the individual messages, and at least one control circuit 23 for the execution of application-specific tasks. The bus driver converts the serial data, arriving from the protocol circuit 22 via the line 24, into signal levels or wake-up levels on the bus 11. Via lines 26 and 27, the bus driver 21 can be set to the sleep mode in which the power consumption is very low, to the normal mode or to the wake-up mode. The receiver in the bus driver 21 transmits signals received from the bus 11 as data, via the line 25, to the protocol circuit 22 for further processing, said protocol circuit applying the data to the control circuit 23. The protocol circuit 22 also receives data from the control circuit 23 for application to the bus driver 21. The bus driver can signal a detected wake-up request via the line 28. The station is then set to an active mode; for example, parts of the station, such as the bus driver or also parts of the control circuit, are then connected to the supply voltage.

Figure 3:
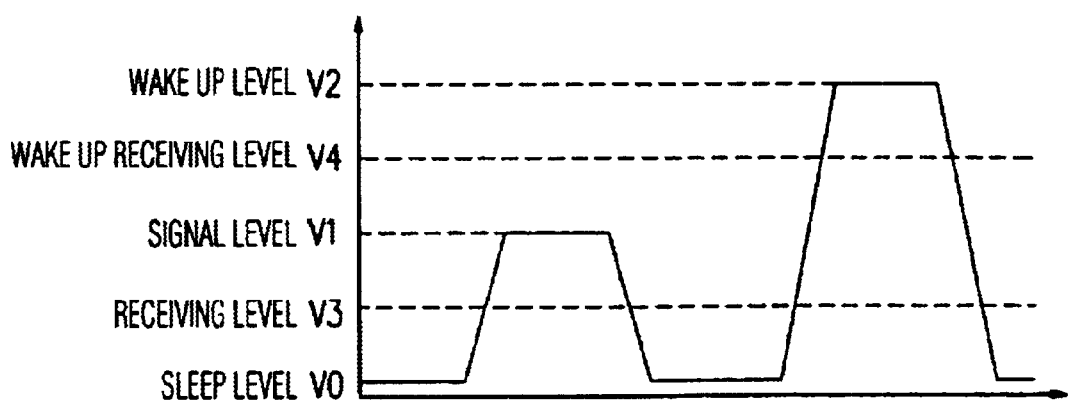
FIG. 3 shows various signal levels and threshold values.

As is shown in FIG. 3, the bus driver 21 can adjust the following levels on the bus 11:

a sleep level V0 which can at the same time be interpreted as a logic "0", a signal level V1 which is interpreted as a logic "1", a wake-up level V2 which is also interpreted as a logic "1"; upon a change-over of the level from V0 to V1, or vice versa, only the receiving level V3 is exceeded whereas upon a change-over of the level from V0 to V2, or vice versa, both receiving levels V3 and V4 are exceeded, V4 representing the wake-up receiving level.

Figure 4:
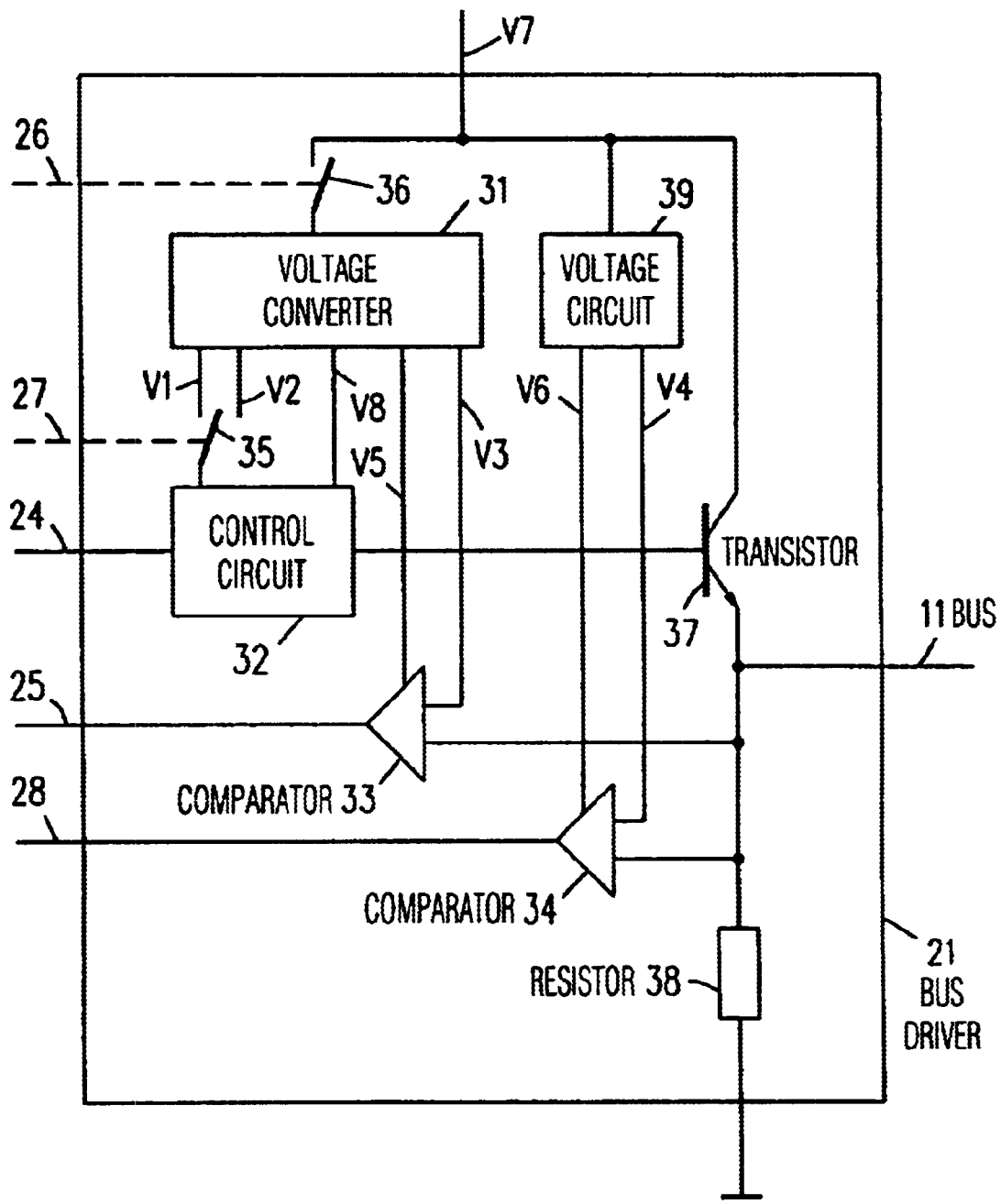

FIG. 4 shows the construction principle of the bus driver 21. From an applied voltage V7 a voltage converter 31 forms the voltages V1 as the signal level and V2 as the wake-up level for the control circuit 32 which itself, in the event of a logic "1" on the line 24, originating from the control circuit 23 in FIG. 2, switches the transistor 37 as a voltage follower in such a manner that the level V1 or V2 prevails on the bus 11. Via the line 27, also originating from the control circuit 23, the switch 35 is switched over from V1 to V2 and hence from the normal mode to the transmission of a wake-up level. In the case of a logic "0" on the line 24, the transistor 37 remains switched off and the sleep level imposed by the resistor 38 occurs on the bus.

The receiver in the bus driver 21 is formed essentially by the comparators 33 and 34. The voltage converter 31 also provides the reference voltage V3 for the reception of data by means of the comparator 33 and the supply voltage V5 for feeding the comparator 33. Irrespective of the fact whether a station transmits by way of signal levels or wake-up levels, the data is always correctly received because of the receiving threshold V3 which is effective for both levels, said data being applied to the protocol circuit 22 in FIG. 2 via the line 25. The circuit 39 supplies the reference voltage V4 and the supply voltage V6 for the reception of the wake-up signals by means of the comparator 34, said voltages being applied to the control circuit 23 in FIG. 2 via the line 28.

Via the line 26 from the control circuit and the switch 36, the bus driver can be set to the sleep mode in that the voltage converter 31, and hence the voltages V1, V2, V3, V5 and V8 are switched off and only the circuit 39 remains active (and hence also the comparator 34) in order to evaluate a wake-up level arriving and to output a signal via the line 28. Via the line 26, further circuits of the stations can also be switched off, for example the protocol circuit.

What is claimed is:

1. A transmission system comprising:

a plurality of stations, wherein the stations have a passive mode and, in response to a wake-up signal, an active mode, in the active mode information is transmitted using at least two different voltage levels, and wherein the wake-up signal is transmitted using a third voltage level which lies outside the at least two different voltage level range for the transmission of information, and allows active stations to communicate with each other without waking passive stations.

2. The system of claim 1, wherein the stations further include a bus driver to determined if a received signal is a wake-up signal by determining whether the voltage level of the received signals is outside the at least two voltage levels.

3. The system of claim 1, wherein the stations further include a means for determining if a received signal is a wake-up signal by determining whether the voltage level of the received signals is outside the at least two voltage levels.

4. A station for use in a transmission system having a plurality of station, the station comprising:

a receiver for receiving data signals, using at least two different voltage levels, wherein portions of the station are switchable to a passive mode in response to a wake-up signal and enables all portions of the station to an active mode, wherein the wake-up signal is transmitted using a third voltage level which lies outside the at least two different voltage levels for the reception of information, and allows active stations to communicate with each other without waking passive stations.

5. The station as claimed in claim 4, wherein the receiver is arranged to process the wake-up signal in the same way as the signal having the voltage level nearest to the wake-up level.

6. The station of claim 4, wherein the station further includes a means for determining if a received signal is a wake-up signal by determining whether the voltage level of the received signal is outside the at least two voltage levels.

* * * * *